United States Patent
Kang et al.

(10) Patent No.: US 8,194,218 B2
(45) Date of Patent: Jun. 5, 2012

(54) IN-PLANE SWITCHING MODE LIQUID CRYSTAL DISPLAY DEVICE

(75) Inventors: Won Seok Kang, Kyongsangbuk-do (KR); Won Ho Lee, Seongnam-shi (KR)

(73) Assignee: LG Display Co., Ltd., Seoul (KR)

( * ) Notice: Subject to any disclaimer, the term of this patent is extended or adjusted under 35 U.S.C. 154(b) by 280 days.

(21) Appl. No.: 11/158,477

(22) Filed: Jun. 22, 2005

(65) Prior Publication Data

US 2005/0280763 A1 Dec. 22, 2005

(30) Foreign Application Priority Data

Jun. 22, 2004 (KR) .................. 10-2004-0046523

(51) Int. Cl.
  *G02F 1/1343* (2006.01)
(52) U.S. Cl. ............................................. 349/141
(58) Field of Classification Search ............ 349/141, 349/142, 145, 146
  See application file for complete search history.

(56) References Cited

U.S. PATENT DOCUMENTS

| | | | | |
|---|---|---|---|---|
| 5,907,379 | A * | 5/1999 | Kim et al. | 349/141 |
| 5,946,066 | A * | 8/1999 | Lee et al. | 349/141 |
| 6,069,678 | A * | 5/2000 | Sakamoto et al. | 349/141 |
| 6,088,078 | A * | 7/2000 | Kim et al. | 349/141 |
| 6,091,473 | A * | 7/2000 | Hebiguchi | 349/141 |
| 6,097,454 | A * | 8/2000 | Zhang et al. | 349/43 |
| 6,281,958 | B1 * | 8/2001 | Nakajima | 349/141 |
| 6,317,182 | B1 * | 11/2001 | Shimizu et al. | 349/141 |
| 6,341,004 | B1 * | 1/2002 | Kondo et al. | 349/141 |
| 6,717,628 | B2 * | 4/2004 | Kumagawa et al. | 349/38 |
| 6,781,645 | B2 * | 8/2004 | Kikkawa | 349/44 |
| 6,801,264 | B2 * | 10/2004 | Kumagawa et al. | 349/38 |
| 6,888,600 | B2 * | 5/2005 | Shimizu et al. | 349/141 |
| 6,894,756 | B2 * | 5/2005 | Moon et al. | 349/141 |
| 6,912,033 | B2 * | 6/2005 | Ashizawa et al. | 349/141 |
| 7,233,380 | B2 * | 6/2007 | Chae | 349/141 |
| 2003/0234903 | A1 * | 12/2003 | Hong et al. | 349/141 |
| 2005/0078257 | A1 * | 4/2005 | Lee et al. | 349/141 |
| 2005/0140899 | A1 * | 6/2005 | Ko | 349/141 |

FOREIGN PATENT DOCUMENTS

JP 11-125835 A 5/1999

* cited by examiner

*Primary Examiner* — Mark Robinson
*Assistant Examiner* — Paisley L Arendt
(74) *Attorney, Agent, or Firm* — Brinks Hofer Gilson & Lione

(57) ABSTRACT

An In-Plane Switching (IPS) mode LCD device is disclosed, to prevent the distortion of transverse electric field in a method of decreasing a line width of a common electrode overlapped with a pixel electrode, which includes intersecting gate and data lines that define a pixel region; thin film transistors at an intersection point of the gate and data lines; pixel electrodes formed in the pixel region and connected with a thin film transistor; and common electrodes arranged between the pixel electrodes of the pixel region; wherein, the outermost common electrode, formed adjacent to the data line, is partially overlapped with the pixel electrode, and the line width of the predetermined portion of the outermost common electrode overlapped with the pixel electrode is smaller than the remaining portions of the outermost common electrode.

4 Claims, 14 Drawing Sheets

IN-PLANE SWITCHING MODE LIQUID CRYSTAL DISPLAY DEVICE

This application claims the benefit of the Korean Application No. P2004-46523 filed on Jun. 22, 2004, which is hereby incorporated by reference.

BACKGROUND OF THE INVENTION

1. Field of the Invention

The present invention relates to a liquid crystal display (LCD) device, and more particularly, to an In-Plane Switching (IPS) mode LCD device to prevent the distortion of a transverse electric field by a pixel electrode and a common electrode overlapped with each other.

2. Discussion of the Related Art

Recently, a liquid crystal display (LCD) device has been actively studied and researched owing to advantageous characteristics, such as high contrast ratio, great gray level, high picture quality and low power consumption. Especially, the LCD device is suitable for ultra-thin display device, such as a wall-mountable television. The LCD device has attracted great attention as a new display device that can substitute for a CRT in that the LCD device has thin profile, lightness in weight and low power consumption. As a result, the LCD device is used for a display device of a notebook computer operated by a battery.

Generally, the LCD device has various modes according to the properties of liquid crystal and pattern structures. More specifically, the LCD device is categorized into a Twisted Nematic (TN) mode of controlling liquid crystal directors by applying a voltage after arrangement of liquid crystal directors twisted at 90°, a multi-domain mode of obtaining a wide viewing angle by dividing one pixel into several domains, an Optically Compensated Birefringence (OCB) mode of compensating a phase change of light according to the progressing direction of light by forming a compensation film on an outer surface of a substrate, an In-Plane Switching (IPS) mode of forming a transverse electric field parallel by forming two electrodes on any one substrate, and a Vertical Alignment (VA) mode of arranging a longitudinal (major) axis of liquid crystal molecule vertical to a plane of an alignment layer by using negative type liquid crystal and a vertical alignment layer.

Among them, the IPS mode LCD device includes a color filter array substrate, a thin film transistor TFT array substrate, and a liquid crystal layer. At this time, the color filter array substrate and the thin film transistor array substrate are positioned opposite to each other, and the liquid crystal layer is formed between the two substrates. The color filter array substrate includes a black matrix layer for preventing light leakage, and an R, G and B color filter layer for realizing various colors on the black matrix layer. Also, the thin film transistor TFT array substrate includes gate and data lines intersecting each other to define a pixel region, a switching device formed at an intersection point of the gate and data lines, and common and pixel electrodes alternately formed to generate a transverse electric field.

Hereinafter, a related art IPS mode LCD device will be described with reference to the accompanying drawings. FIG. 1 is a plane view of a related art IPS mode LCD device. FIG. 2 is a cross sectional view along I-I' of FIG. 1.

Referring to FIG. 1 and FIG. 2, a related art IPS mode LCD device includes a thin film transistor array substrate 11. On the thin film transistor array substrate 11, a gate insulating layer 13 is interposed between a gate line 12 and a data line 15, wherein the gate line 12 intersects the data line 15 at right angles to define a unit pixel region. Also, a thin film transistor TFT is formed at the intersection point of the gate line 12 and the data line 15.

The thin film transistor TFT is comprised of a gate electrode 12a, the gate insulating layer 13, a semiconductor layer 14, and source and drain electrodes 15a and 15b. In this case, the gate electrode 12a diverges from the gate line 12, and the gate insulating layer 13 is formed on an entire surface of the thin film transistor TFT array substrate 11 including the gate electrode 12a. The semiconductor layer 14 is formed on the gate insulating layer 13 above the gate electrode 12a. Then, the source and drain electrodes 15a and 15b, diverging from the data line 15, are overlapped with both sides of the semiconductor layer 14.

Each pixel region includes a common line 25, a common electrode 24 and a pixel electrode 17. The common line 25 is formed in parallel with the gate line 12 inside the pixel region. The common electrode 24 is diverged from the common line 25, wherein the common electrode 24 is comprised of a first common electrode part 24a and a second common electrode part 24b. Also, the pixel electrode 17 is connected with the drain electrode 15b of the thin film transistor TFT through a passivation layer 16, wherein the pixel electrode 17 is comprised of a first pixel electrode part 17a and a second pixel electrode part 17b.

In this case, the common electrode 24 divides the pixel region into a plurality of blocks. In addition, the pixel electrode 17 divides each block to a plurality of sub-blocks. Accordingly, the sub-block has the corner of the pixel electrode 17 formed in shape of '⌐' or '∟', and the corner of the common electrode 24 formed in shape of '⌐' or '∟'. That is, the sub-block is formed in shape of a diamond having the corners of the first and second pixel electrode parts 17a and 17b and the first and second common electrode parts 24a and 24b. In this state, a transverse electric field generates in each of the sub-blocks by the electrodes.

The second pixel electrode part 17b is overlapped with the common line 25, thereby generating a storage capacitance. Accordingly, it is possible to maintain a voltage charged in a liquid crystal capacitor during a turn-off block of the thin film transistor TFT. In the first common electrode part 24a, the outermost common electrode 50 of the pixel region is formed in the edge of the data line 15, thereby preventing the light leakage by preventing the distortion of electric field in the circumstance of the data line 15.

In case the outermost common electrode 50 is formed in the margin of the pixel region and the pixel electrode 17 is formed to define the sub-pixels, as shown in FIG. 1, the first pixel electrode part 17a may be overlapped with the outermost common electrode 50. However, as shown in FIG. 2, if the pixel electrode 17 is overlapped with the outermost common electrode 50, an equipotential may generate between the outermost common electrode 50 and the common electrode 24 when the transverse electric field generates between the pixel electrode 17 and the common electrode 24 in the pixel region. As a result, the transverse electric field may be distorted due to the equipotential generated between the outermost common electrode 50 and the common electrode 24. Accordingly, liquid crystal molecules are not aligned in the desired direction due to the distortion of the electric field, thereby lowering the picture quality.

When forming the sub-blocks of odd or even number in state of forming the outermost common electrodes at the both sides of the pixel region, if the pixel electrode is partially overlapped with the outermost common electrodes, the electric field of the pixel electrode may be distorted due to the outermost common electrode. The distortion of the electric field may occur between the pixel electrode and the common electrode inside the pixel region, as well as between the outermost common electrode and the pixel electrode.

SUMMARY OF THE INVENTION

Accordingly, the present invention is directed to an IPS mode LCD device that substantially obviates one or more problems due to limitations and disadvantages of the related art.

The In-Plane Switching (IPS) mode LCD device disclosed prevents the distortion of a transverse electric field in a method of decreasing a line width of a common electrode overlapped with a pixel electrode.

An IPS mode LCD device includes a plurality of gate and data lines on a substrate, each of the gate lines intersecting each of the data lines, to define a unit pixel region; a plurality of thin film transistors, each of the thin film transistors formed at an intersection point of the gate and data lines; a plurality of pixel electrodes, each of the pixel electrodes formed in the unit pixel region and connected with the thin film transistor; and a plurality of common electrodes, each of the common electrodes arranged between the pixel electrodes of the pixel region; wherein, the outermost common electrode, formed adjacent to the data line, is partially overlapped with the pixel electrode, and the line width of the predetermined portion of the outermost common electrode overlapped with the pixel electrode is smaller than the remaining portions of the outermost common electrode.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, an IPS mode LCD device according to the present invention will be described with reference to the accompanying drawings.

First Embodiment

Figure 1:
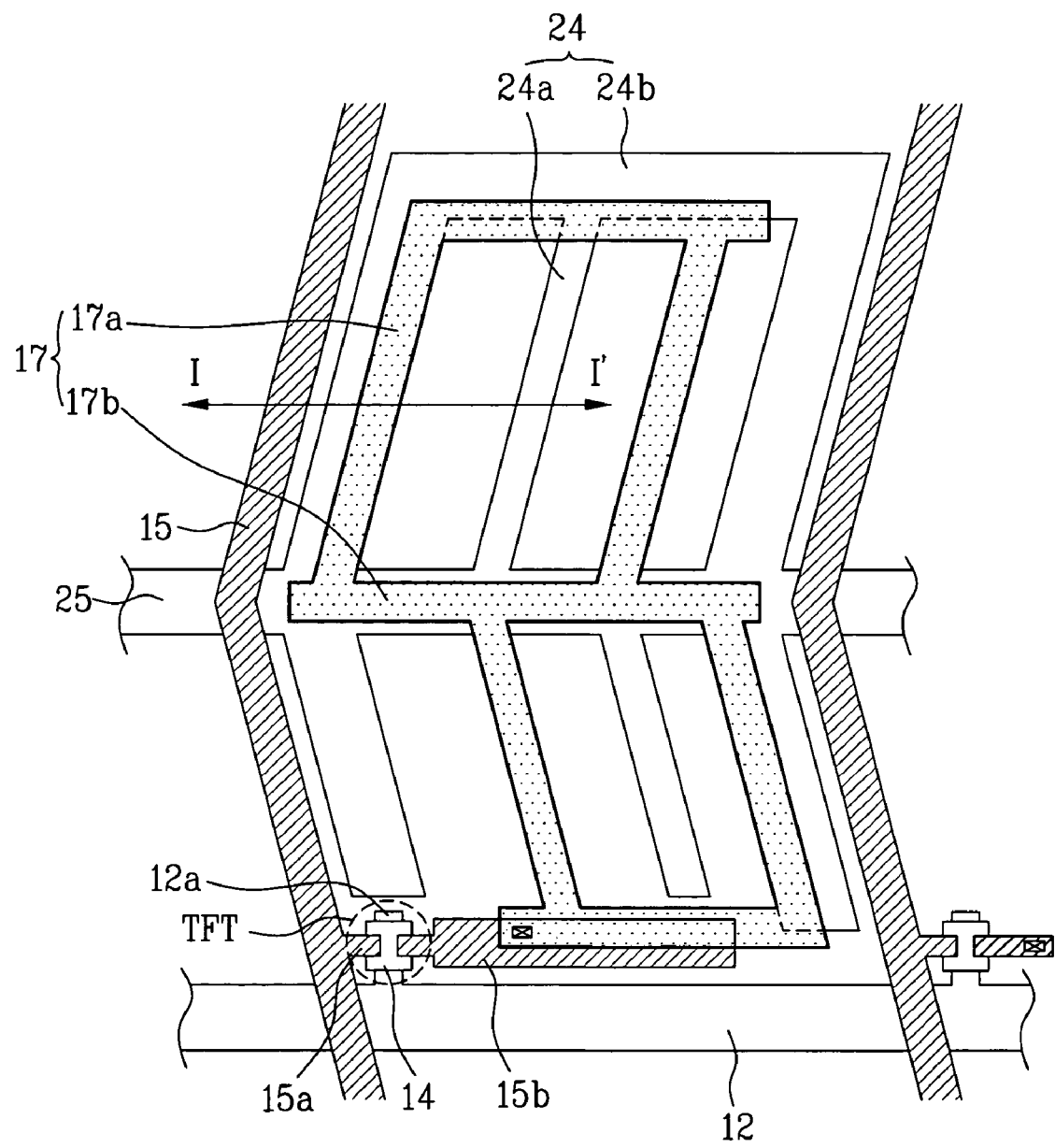
FIG. 1 is a plane view of a related art IPS mode LCD device.
Figure 2:
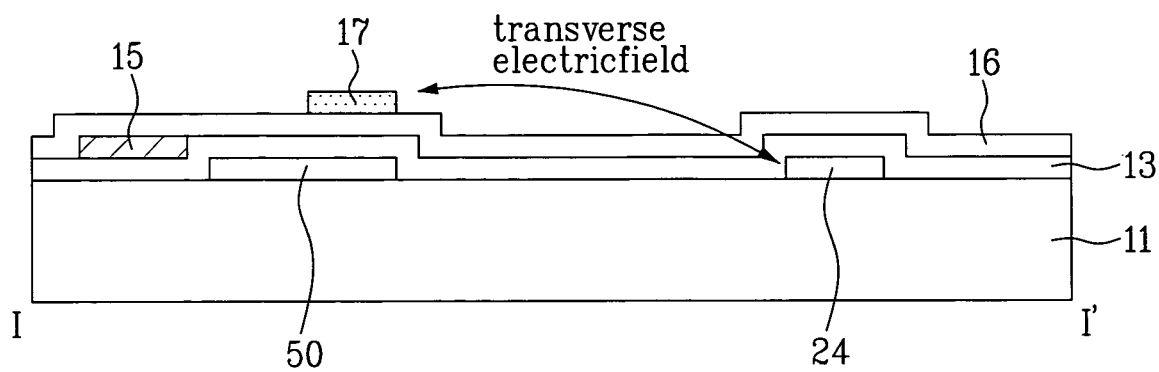
FIG. 2 is a cross sectional view along I-I' of FIG. 1.
Figure 3:
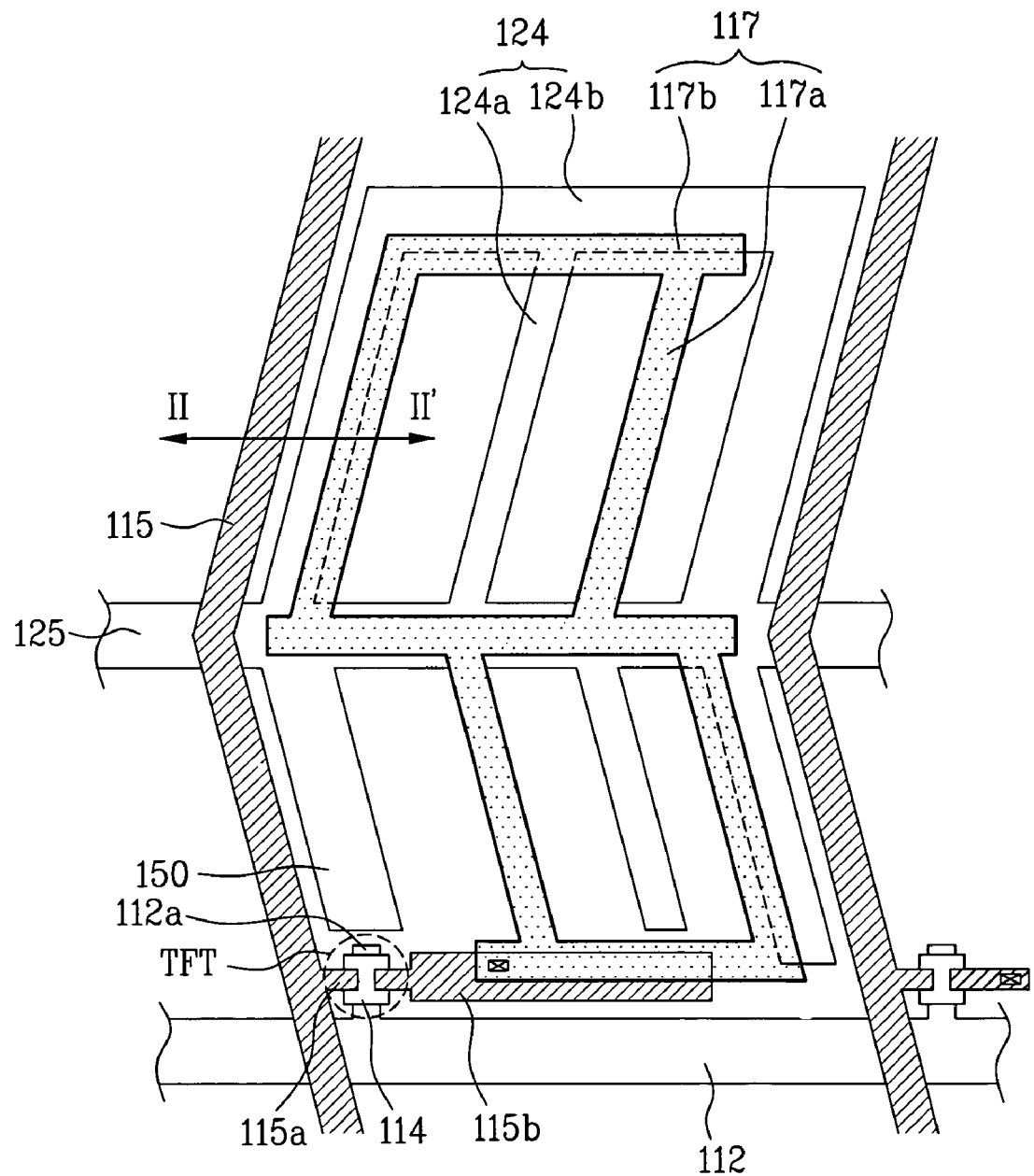
FIG. 3 is a plane view of an IPS mode LCD device according to an exemplary first embodiment of the present invention.
Figure 4:
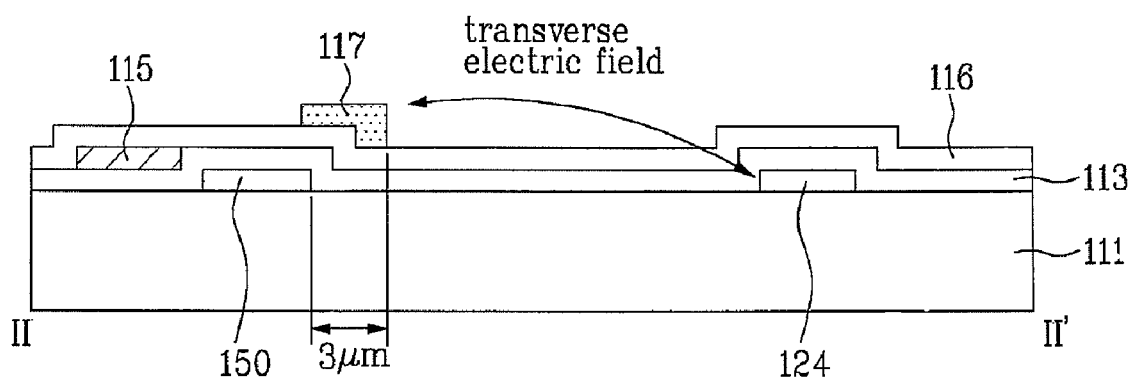
FIG. 4 is a cross sectional view along II-II' of FIG. 3.
Figure 5:
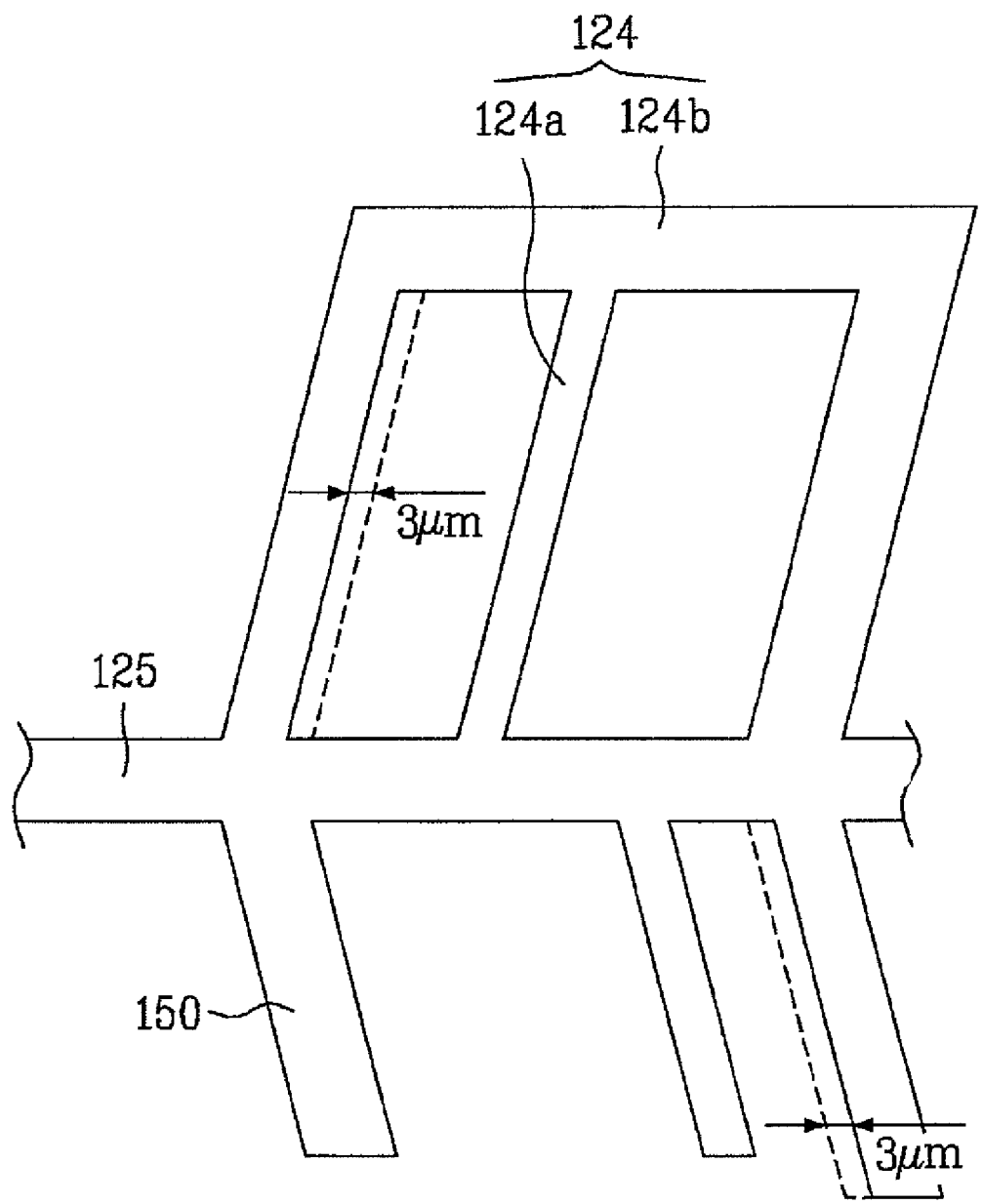
FIG. 5 is a plane view of a common electrode in an IPS mode LCD device according to the exemplary first embodiment of the present invention.

FIG. 3 is a plane view of an IPS mode LCD device according to an exemplary first embodiment of the present invention. FIG. 4 is a cross sectional view along II-II' of FIG. 3. FIG. 5 is a plane view of a common electrode in an IPS mode LCD device according to the exemplary first embodiment of the present invention.

In an IPS mode LCD device according to the first embodiment of the present invention, the number of blocks, each of which is defined with a pixel electrode and a common electrode, may be an odd or even number in direction of a gate line, to improve the degree of freedom on design. Also, the IPS mode LCD device according to the first embodiment of the present invention improves an aperture ratio by optimizing a pixel region. In the IPS mode LCD device according to the first embodiment of the present invention, a line width above 1 μm, preferably, about 3 μm, is decreased in the common electrode overlapped with the pixel electrode, thereby preventing the distortion of electric field. Especially, in the case that the outermost common electrode is formed adjacent to the edge of a data line in the margin of the pixel region and the common electrode alternates with the pixel electrode in the pixel region, the line width above 1 μm, preferably, about 3 μm, is decreased in the outermost common electrode overlapped with the pixel electrode.

As shown in FIG. 3, in the case of the IPS mode LCD device according to the first embodiment of the present invention, the data line 115, the common electrode 124 and the pixel electrode 117 are formed in the shape of a zigzag pattern, and the liquid crystal is aligned in the two directions.

More specifically, as shown in FIG. 3, the IPS mode LCD device according to the first embodiment of the present invention includes the gate line 112, the data line 115, a thin film transistor TFT, a common line 125, the plurality of common electrodes 124 and the pixel electrode 117. At this time, the gate line 112 is formed in one direction on a substrate 111, and the data line 115 having a bent structure intersects the gate line 112. The thin film transistor TFT is formed at an intersection point of the gate line 112 and the data line 115. The thin film transistor TFT is comprised of a gate electrode 112a, a semiconductor layer 114, and source and drain electrodes 115a and 115b. Also, the common line 125 is formed in the center of the pixel region in parallel with the gate line 112. The plurality of common electrodes 124 are diverged from the common line 125 to lower and upper directions, wherein the common electrodes 124 are formed in parallel with the data line 115. The pixel electrode 117 having a bent structure is connected with the thin film transistor TFT. Also, the outermost common electrode is partially overlapped with the pixel electrode 117. That is, the predetermined portion of the outermost common electrode overlapped with the pixel electrode 117 is narrower than the remaining portion of the outermost common electrode, whereby the outermost common electrode has a dual width.

At this time, the common electrodes 124 are comprised of first common electrode parts 124a being protruded from the common line 125 in parallel with the data line 115, and second common electrode parts 124b for connecting the first common electrode parts 124a with one another. The pixel electrode 117 is comprised of first pixel electrode parts 117a and second pixel electrode parts 117b, wherein each of the first pixel electrode parts 117a is formed between the first common electrode parts 124a in parallel, and each of the second pixel electrode parts 117b connects the first pixel electrode parts 117a with each other.

The pixel region is defined as the plurality of blocks with the first and second common electrode parts 124a and 124b and the first and second pixel electrode parts 117a and 117b. Also, the four corners of the block are formed of the first and second pixel electrode parts 117a and 117b and the first and second common electrode parts 124a and 124b, whereby the block is formed in shape of a quadrangle, for example, a diamond.

As described above, the IPS mode LCD device according to the first embodiment of the present invention is characterized by the decrease on line width of the predetermined portion of the outermost common electrode 150 overlapped with the pixel electrode 117. Especially, even in the case of the outermost common electrode 150 being formed adjacent to the edge of the data line 115 in the margin of the pixel region, and the outermost common electrode 150 is overlapped with the pixel electrode 117, it is possible to decrease the line width in the predetermined portion of the outermost common electrode 150 overlapped with the pixel electrode 117. That is, as shown in FIG. 5, the line width is decreased in the predetermined portion of the outermost common electrode 150 overlapped with the pixel electrode 117, more than 1 μm, preferably by about 3 μm. Accordingly, the edge of the outermost common electrode 150 is positioned inside the edge of the pixel electrode 117.

The outermost common electrode 150 is overlapped with the pixel electrode 117 at a minimum degree. However, if the outermost common electrode 150 is not overlapped with the pixel electrode 117, a parasitic electric field may generate between the outermost common electrode 150 and the pixel electrode 117. As a result, liquid crystal may be driven in the undesired direction. In the case of the outermost common electrode 150 being positioned inside the edge of the pixel electrode 117, as shown in FIG. 4, a transverse electric field, generated between the pixel electrode 117 and the common electrode 124, is not distorted by the electric field generated in the outermost common electrode 150.

Also, the second pixel electrode part 117b is overlapped with the common line 125 and the second common electrode part 124b, thereby generating a storage capacitance. In this case, the line width of the second pixel electrode part 117b is smaller than the line width of the common line 125. If the line width of the second pixel electrode part 117b is larger than the line width of the common line 125, the transverse electric field inside the block is distorted due to the second pixel electrode part 117b. At this time, the common line 125, the common electrode 124 and the outermost common electrode 150 are formed as one body. Also, the gate line 112 is formed as one body with the gate electrode of the thin film transistor TFT. The common line 125, the common electrode 124, the outermost common electrode 150, the gate line 112 and the gate electrode are formed together on the same layer with low-resistance metal.

In addition, a gate insulating layer ('113' of FIG. 4) is formed on the entire surface of the substrate including the gate line 112. Also, a passivation layer ('116' of FIG. 4) is additionally formed on the entire surface of the substrate including the data line 115. The pixel electrode 117 is formed on the passivation layer.

In the IPS mode LCD device according to the first embodiment of the present invention, the line width is decreased by the predetermined portion of the common electrode overlapped with the pixel electrode, to prevent the distortion of electric field. Especially, the line width is decreased in the common electrode overlapped with the pixel electrode, more than 1 μm, preferably by about 3 μm.

Hereinafter, the electric field and transmissivity according to the overlapped line width between the pixel electrode and the outermost common electrode will be described with reference to FIG. 6 to FIG. 10.

Figure 6:
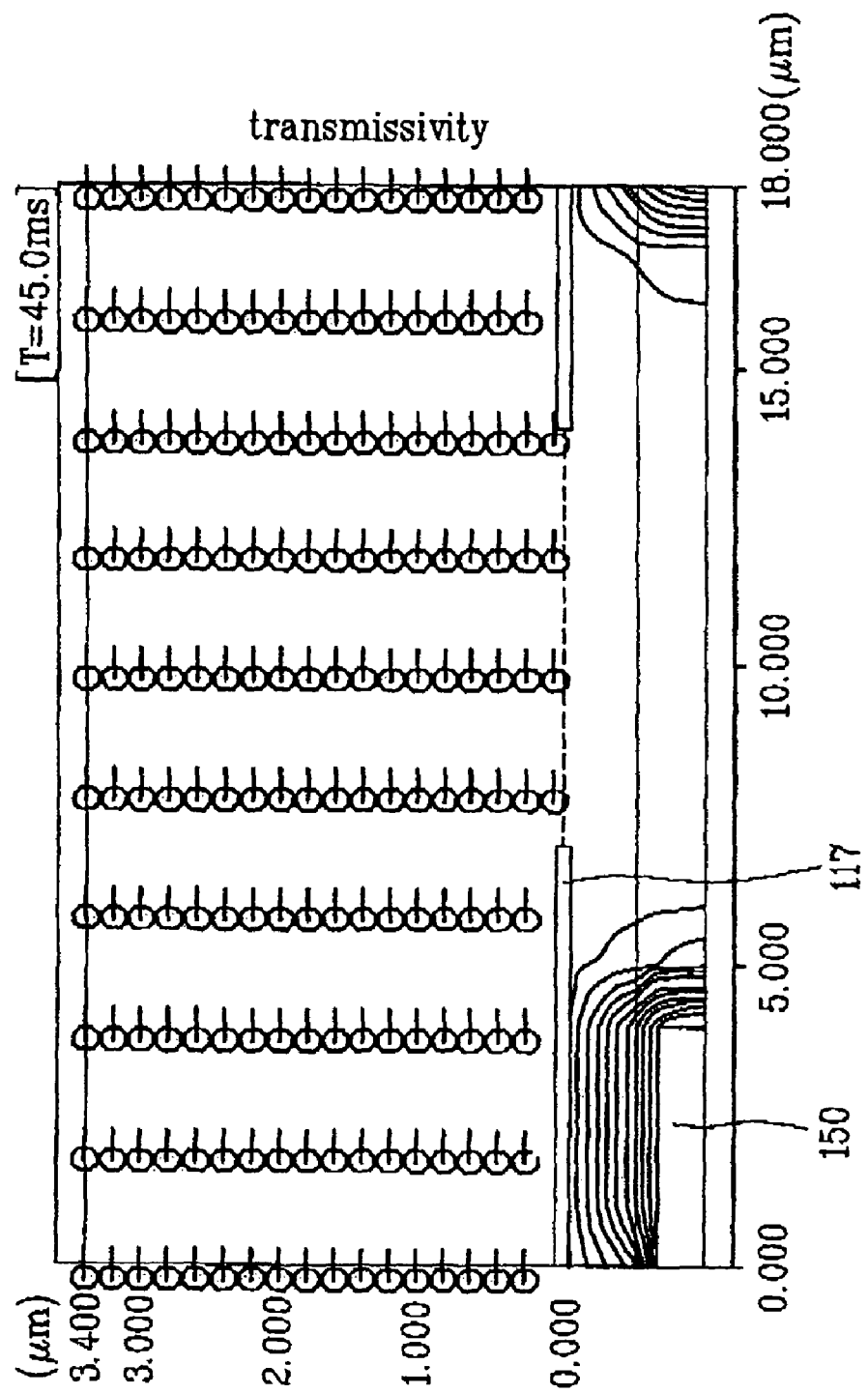
FIG. 6 is a graph of showing the electric field and transmissivity in the case of decreasing a line width by 3 μm of a common electrode overlapped with a pixel electrode.

FIG. 6 is a graph of showing the electric field and transmissivity in the case of decreasing the width of the common electrode overlapped with the pixel electrode by 3 μm. As shown in FIG. 6, the equipotential, formed between the pixel electrodes 117, is not distorted by the electric field (solid line) formed in the circumference of the outermost common electrode 150. At this time, liquid crystal is not driven, whereby the transmissivity (spotted line) is '0'.

Figure 7:
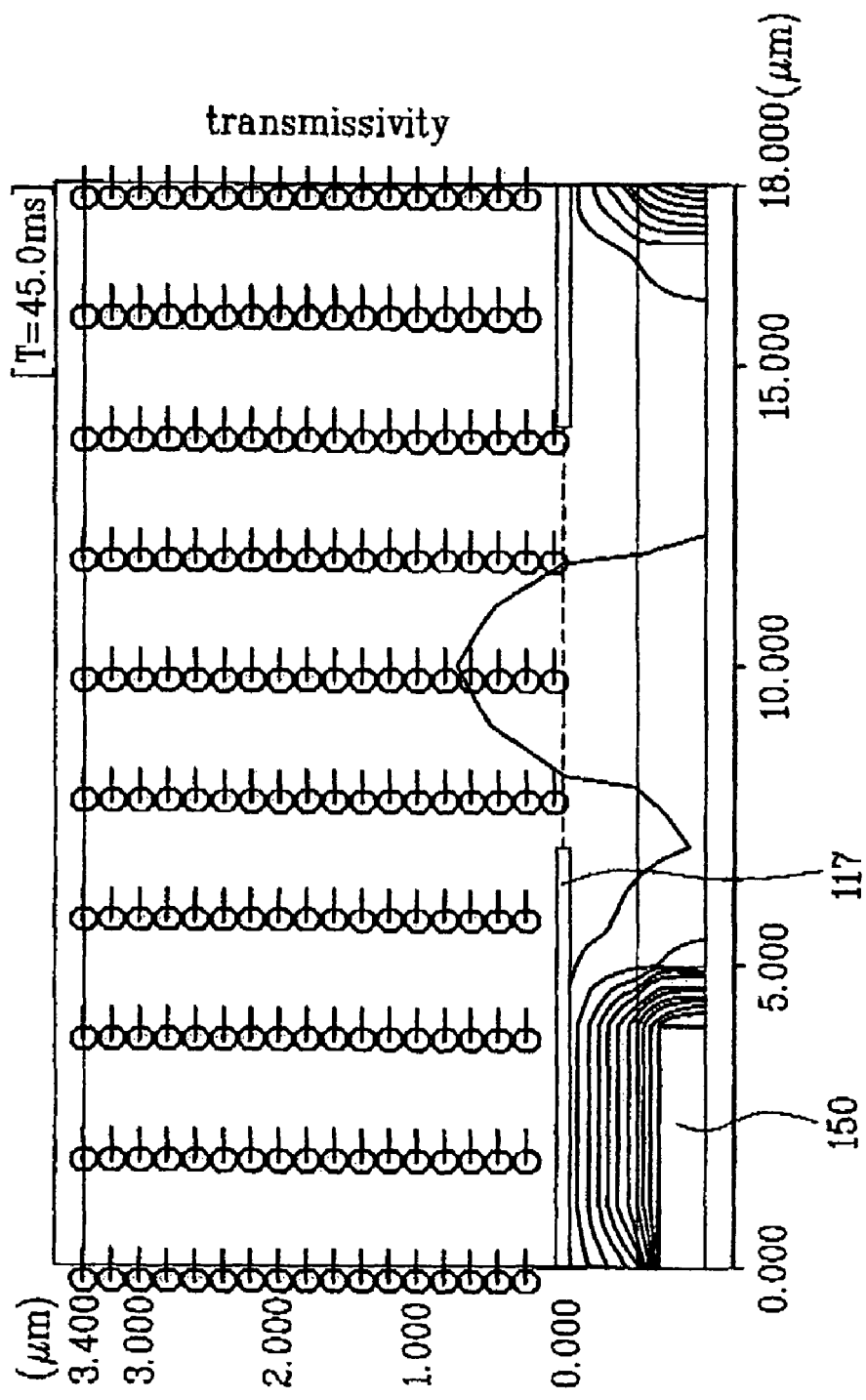
FIG. 7 is a graph of showing the electric field and transmissivity in the case of decreasing a line width by 2 μm of a common electrode overlapped with a pixel electrode.

FIG. 7 is a graph of showing the electric field and transmissivity in the case of decreasing the width of the common electrode overlapped with the pixel electrode by 2 μm. As shown in FIG. 7, the electric field (solid line) formed in the circumference of the outermost common electrode 150 has an effect on the liquid crystal. In this case, since the transmissivity (spotted line) is still '0', there is no light leakage.

Figure 8:
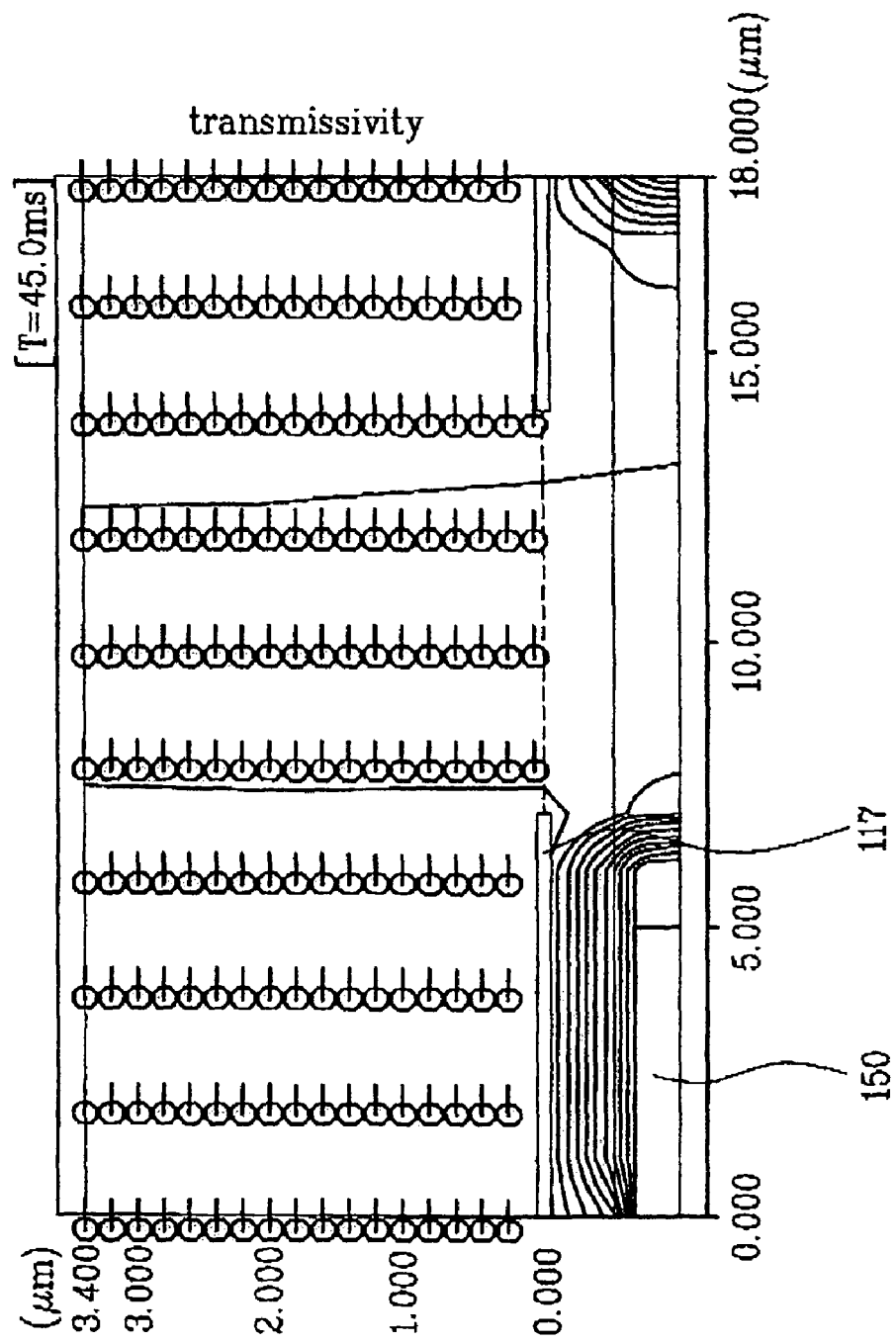
FIG. 8 is a graph of showing the electric field and transmissivity in the case of decreasing a line width by 1 μm of a common electrode overlapped with a pixel electrode.

FIG. 8 is a graph of showing the electric field and transmissivity in case of decreasing the width of the common electrode overlapped with the pixel electrode by 1 μm. As shown in FIG. 8, the electric field (solid line) formed in the circumference of the outermost common electrode 150 has an effect on the liquid crystal. Also, the transmissivity (spotted line) has the predetermined value, which means that there is the light leakage.

Figure 9:
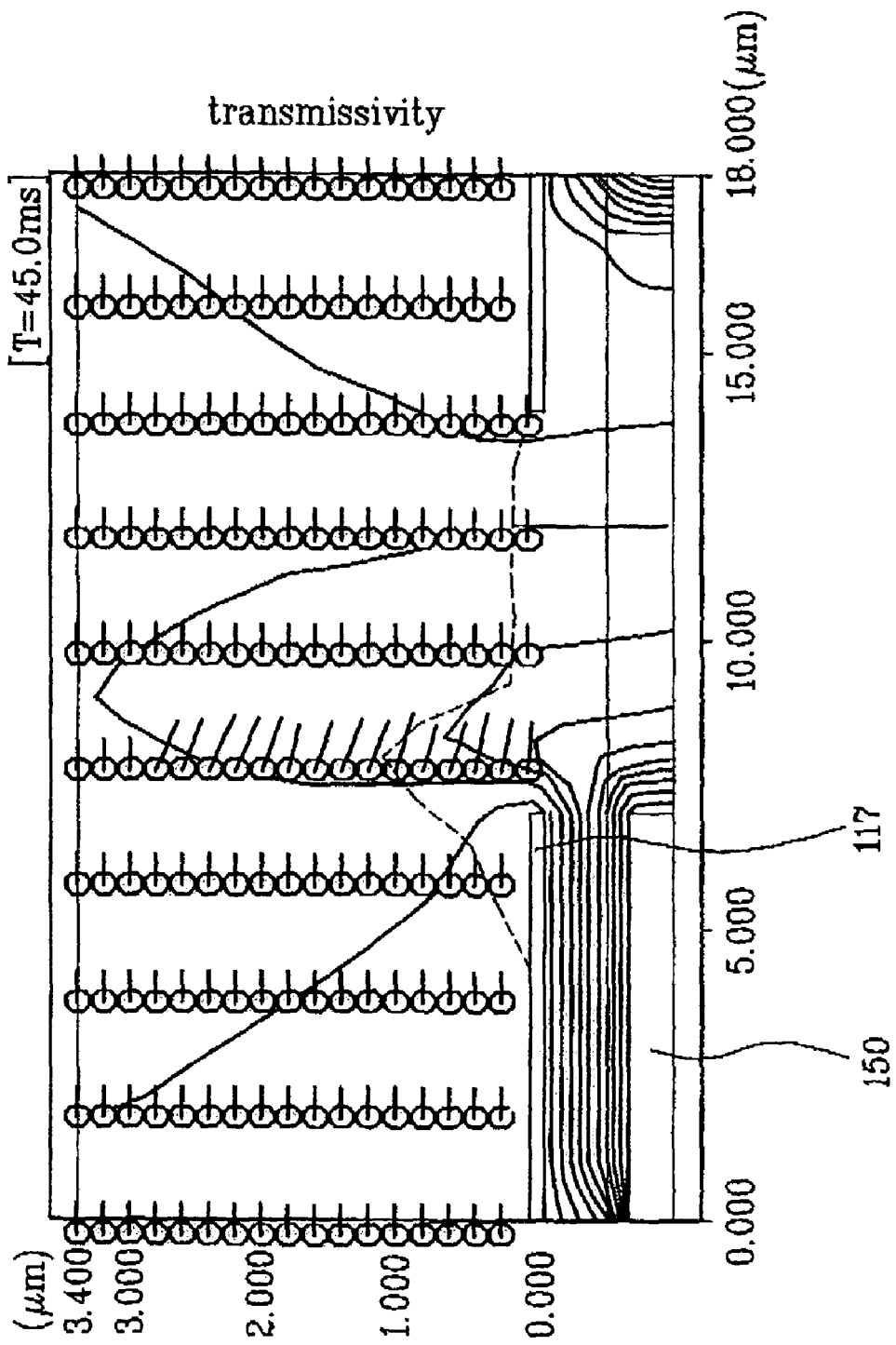
FIG. 9 is a graph of showing the electric field and transmissivity in the case of forming edges of a pixel electrode and a common electrode on the same line.

FIG. 9 is a graph of showing the electric field and transmissivity in the case of forming edges of the pixel electrode and the common electrode on the same line. As shown in FIG. 9, the electric field (solid line) formed in the circumference of the outermost common electrode 150 distorts the equipotential generated between the pixel electrodes 117. Also, liquid crystal in the edge of the pixel electrode 117 overlapped with the outermost common electrode 150 is driven so that the curve of transmissivity (spotted line) becomes large. At this time, the curve of transmissivity indicates the intensity of light leakage.

Figure 10:
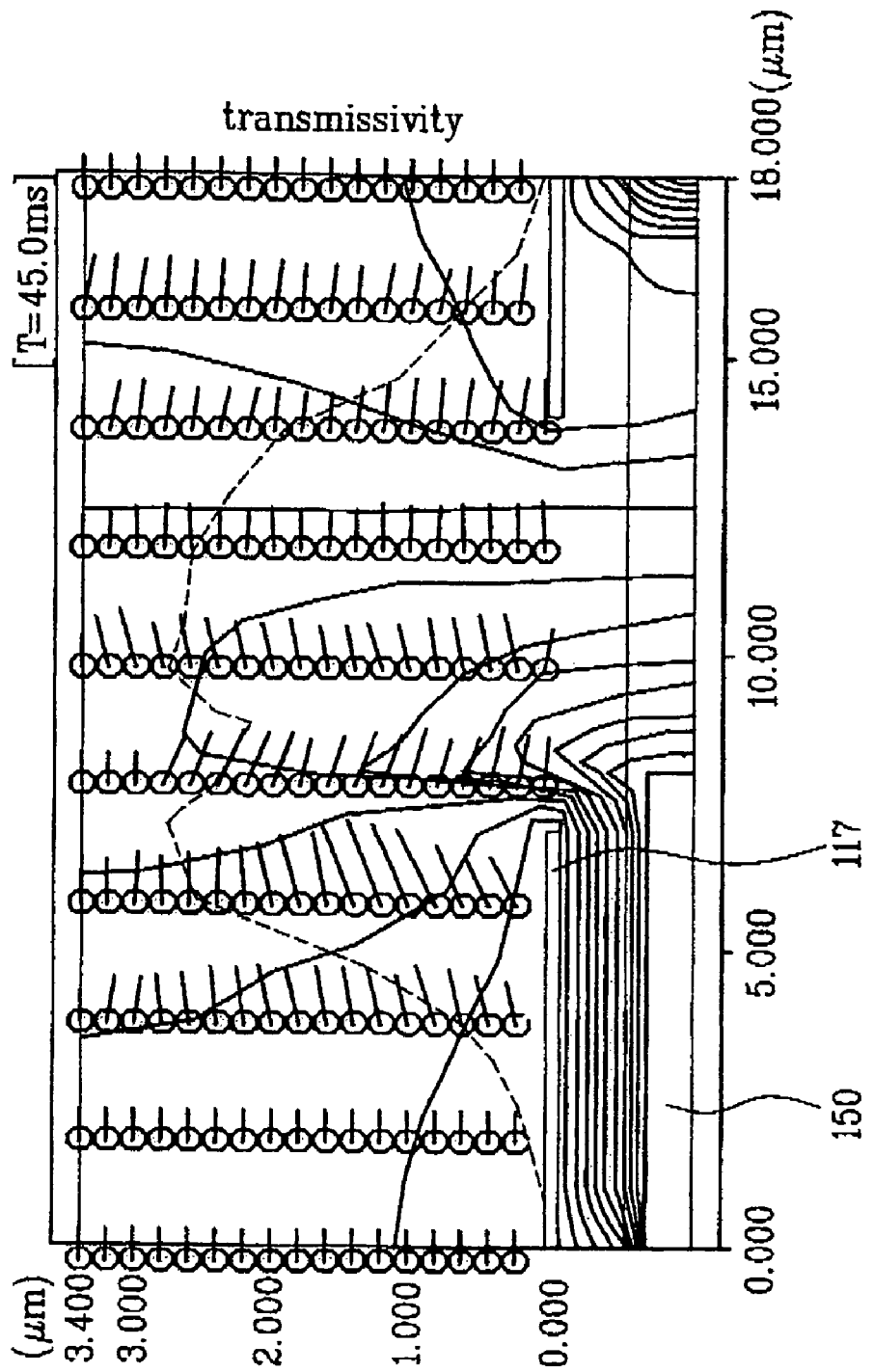
FIG. 10 is a graph of showing the electric field and transmissivity in the case of positioning an edge of a common electrode outside of an edge of a pixel electrode at a distance of 1 μm.

FIG. 10 is a graph of showing the electric field and transmissivity in the case of positioning the edge of the common electrode outside of the edge of the pixel electrode at a distance of 1 μm. In this case, liquid crystal is directly driven by the electric field generated in the circumference of the outermost common electrode 150. Also, as the curve of transmissivity becomes larger, the light leakage becomes more serious.

From the data of simulation, it is known that there is no distortion of electric field when the line width of the common electrode overlapped with the pixel electrode is decreased by about 1 μm. Also, preferably, even though the line width in the common electrode overlapped with the pixel electrode is decrease by about 3 μm, there is no light leakage and distortion of electric field. That is, as shown above, it is possible to prevent the distortion of electric field and the light leakage by decreasing the line width in the common electrode overlapped with the pixel electrode, by more than about 1 μm, preferably by about 3 μm. In this case, the pixel electrode is overlapped with the common electrode when decreasing the line width of the common electrode, to prevent the undesired drive of liquid crystal.

Second Embodiment

Figure 11:
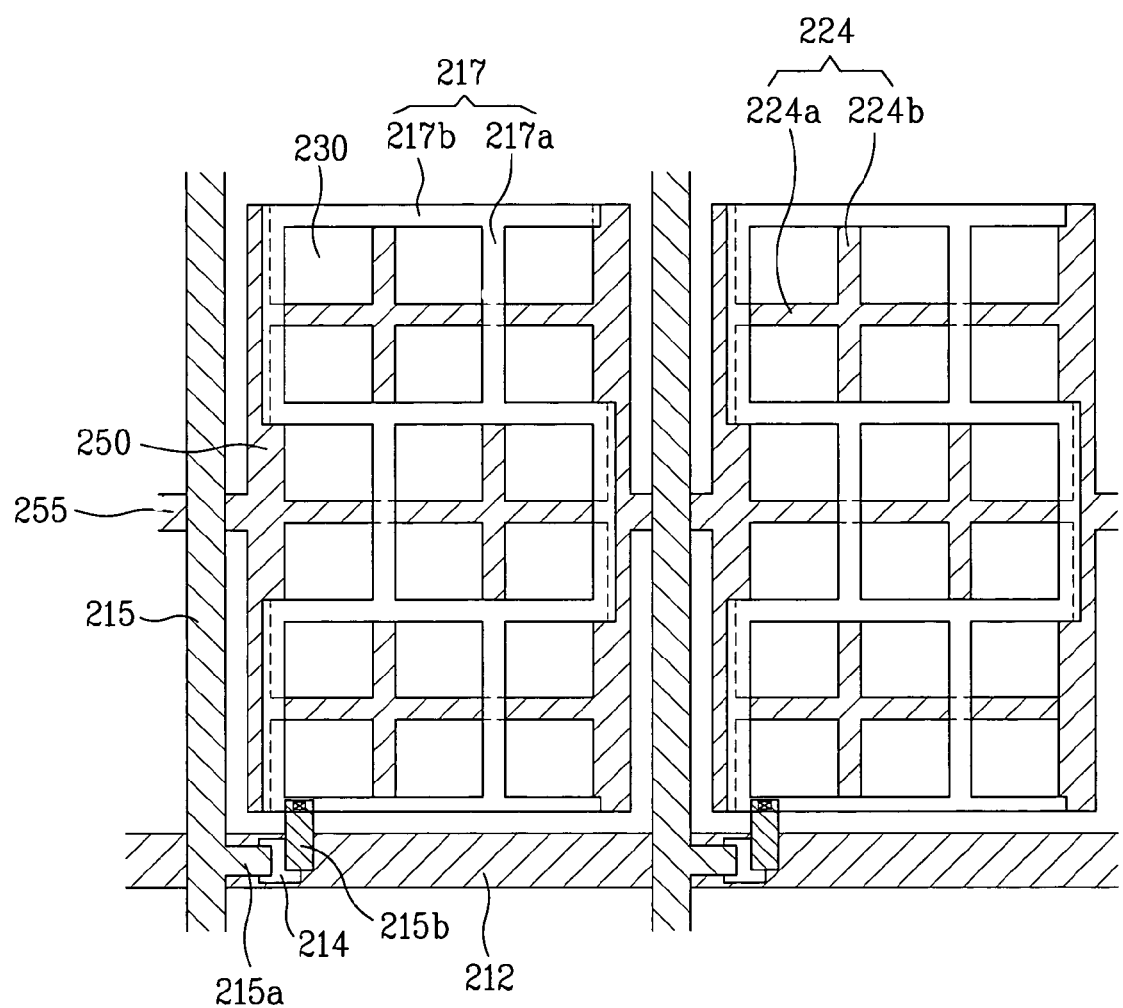
FIG. 11 is a plane view of an IPS mode LCD device according to an exemplary second embodiment of the present invention.
Figure 12:
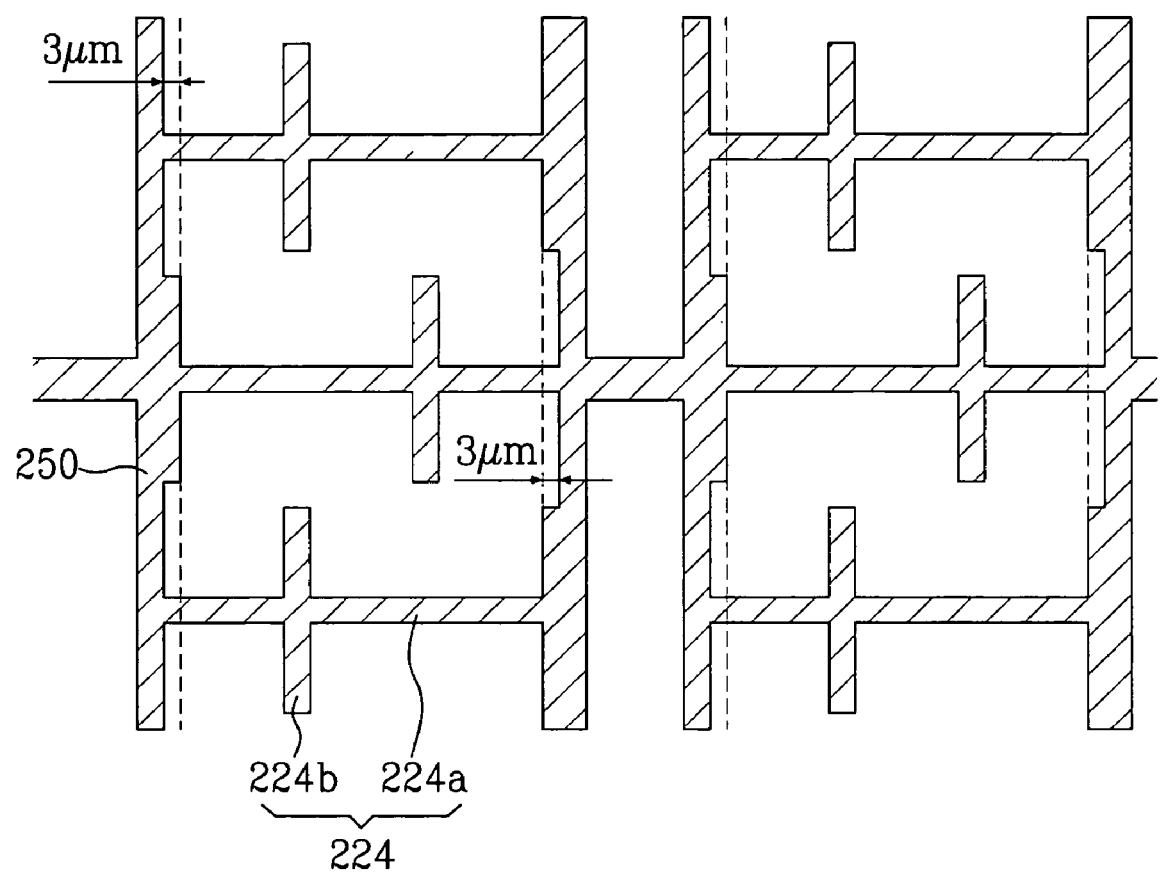
FIG. 12 is a plane view of a common electrode in an IPS mode LCD device according to the exemplary second embodiment of the present invention.

FIG. 11 is a plane view of an IPS mode LCD device according to an exemplary second embodiment of the present invention. FIG. 12 is a plane view of a common electrode in an IPS mode LCD device according to the exemplary second embodiment of the present invention.

In an IPS mode LCD device according to the second embodiment of the present invention, the number of blocks, which is defined as a pixel electrode and a common electrode, may be an odd or even number in direction of a gate line. In the IPS mode LCD device according to the second embodiment of the present invention, a line width is decreased in the common electrode overlapped with the pixel electrode by more than about 1 μm, preferably by about 3 μm, thereby preventing the distortion of electric field generated in the circumference of outermost common electrode.

Especially, in the case of the IPS mode LCD device according to the second embodiment of the present invention, as shown in FIG. 11, a data line 215, the common electrode 224 and the pixel electrode 217 are respectively formed in shape of straight line.

As shown in FIG. 11, the IPS mode LCD device according to the second embodiment of the present invention includes the plurality of gate lines 212, the plurality of data lines 215, a thin film transistor TFT, a common line 255, the common electrode 224 and the pixel electrode 217. At this time, the plurality of gate lines 212 are formed in one direction, and the plurality of data lines 215 intersect the gate lines 212, thereby defining a plurality of pixel regions. Then, the thin film transistor TFT is formed at each intersection point of the gate and data lines 212 and 215 inside the pixel region. The thin film transistor TFT is comprised of a gate electrode, a semiconductor layer 214, and source and drain electrodes 215a and 215b. Also, the common electrode 224 and the pixel electrode 217 are formed in shape of ' ¬' or ' ∟', which divides the unit pixel region into a plurality of blocks 230 of a matrix-type configuration.

The common electrode 224 is comprised of a plurality of first common electrode parts 224a being in parallel with the gate line 212, and a plurality of second common electrode parts 224b being in parallel with the data line 215. In addition, a common line 225 is formed so as to connect the common electrodes 224 of the adjacent pixel regions, so that a common signal is transmitted to an active region.

At this time, the outermost common electrodes 250 are formed at both edges of the data line 215 in the margin of the pixel region, to prevent the light leakage.

Also, the pixel electrode 217 is comprised of a plurality of first pixel electrode parts 217a and a plurality of second pixel electrode parts 217b. In this case, each of the plurality of first pixel electrode parts 217a is positioned between the second common electrode parts 224b. Also, each of the second pixel electrode parts 217b is positioned between the first common electrode parts 224a, wherein the second pixel electrode part 217b is diverged from the first pixel electrode part 217a. Also, each of the second pixel electrode parts 217b is connected with the drain electrode 215b of the thin film transistor TFT.

At this time, the first pixel electrode part 217a is partially overlapped with the outermost common electrode 250. In this state, it is possible to decrease the line width in the outermost common electrode 250 overlapped with the pixel electrode 217. That is, the line width above 1 μm is decreased in the predetermined portion of the outermost common electrode 250 overlapped with the pixel electrode 217, preferably by about 3 μm. The outermost common electrode 250 is overlapped with the pixel electrode 217 at the minimum degree, so as to prevent the parasitic electric field between the pixel electrode 217 and the outermost common electrode 250.

As shown in FIG. 12, the outermost common electrode 250 is partially overlapped with the pixel electrode 217, wherein the predetermined portion of the outermost common electrode 250 overlapped with the pixel electrode 217 is narrower than the remaining portion of the outermost common electrode, whereby the outermost common electrode has a dual width. In this state, if the first and second common electrode parts 224a and 224b are overlapped with the pixel electrode 217, it is possible to decrease the line width therein.

As applying a voltage to the IPS mode LCD device according to the second embodiment of the present invention, the electric field is formed at an angle of 45° or 135° by the pixel electrode 217 and the common electrode 224 formed in shape of ' ¬' or ' ∟' in each block 230. Accordingly, liquid crystal molecules are aligned at an angle of 45° or 135°, so that it is possible to stably maintain the maximum transmissivity.

In the IPS mode LCD device according to the second embodiment of the present invention, the outermost common electrodes are formed at both sides of the pixel region, and the first pixel electrode part 217a is formed between the second common electrode parts 224b. In the aforementioned IPS mode LCD device according to the second embodiment of the present invention, the even numbered blocks may be provided in the unit pixel region according to the size of the unit pixel region.

Third Embodiment

Figure 13:
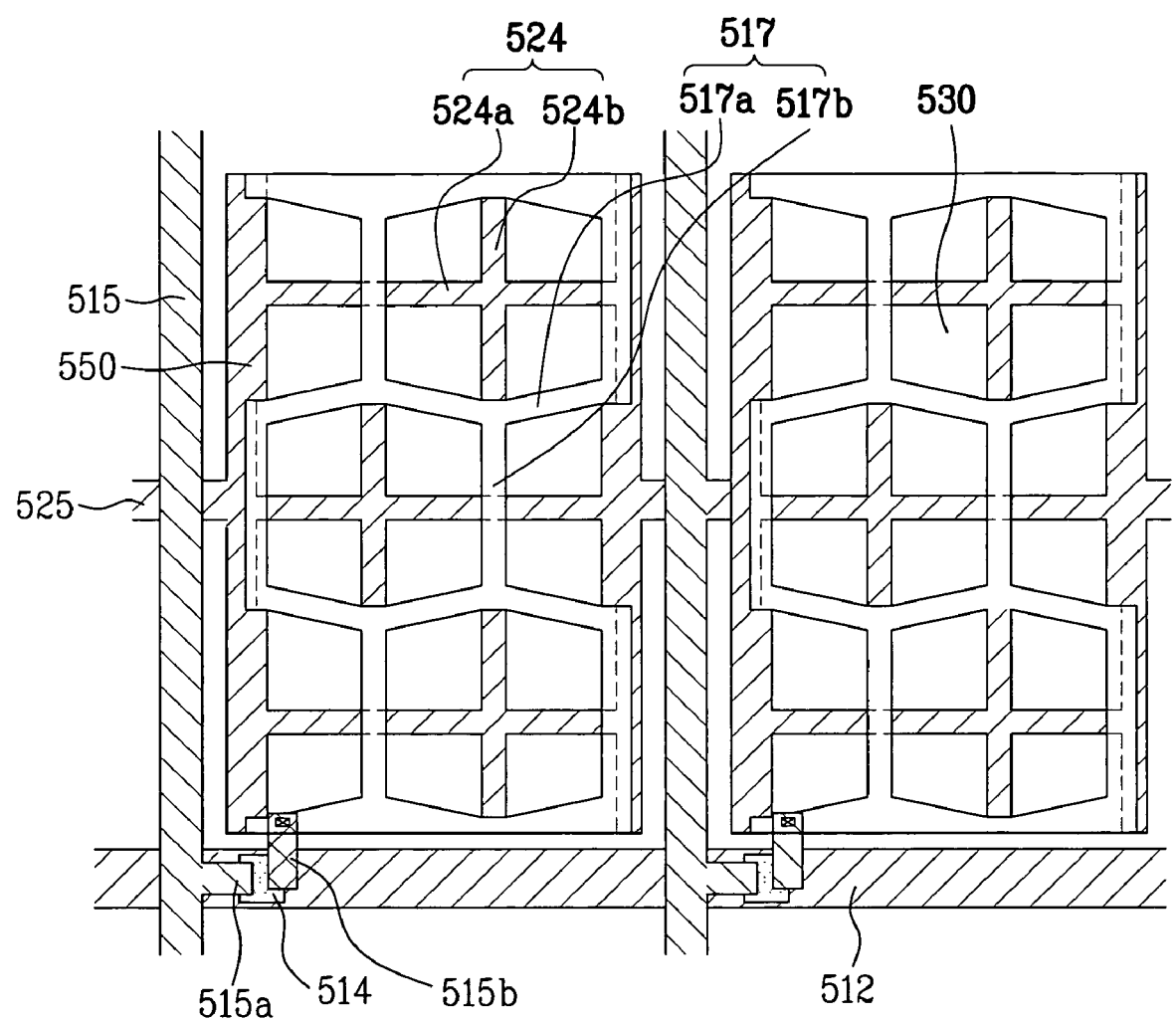
FIG. 13 is a plane view of an IPS mode LCD device according to an exemplary third embodiment of the present invention.
Figure 14:
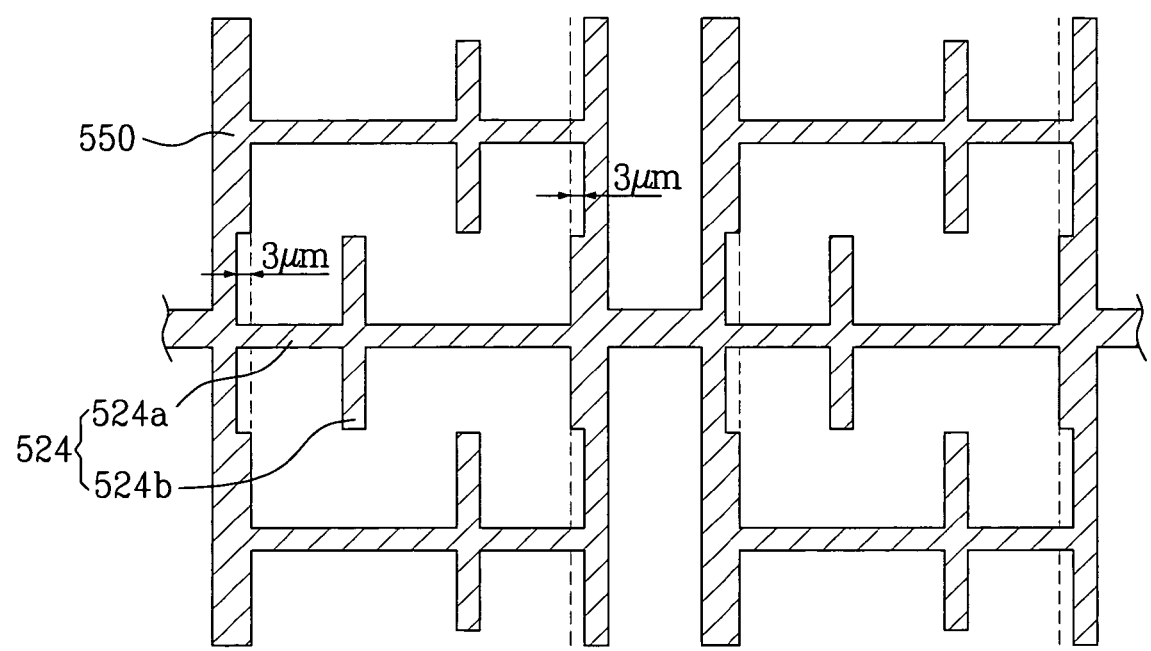
FIG. 14 is a plane view of a common electrode in an IPS mode LCD device according to the exemplary third embodiment of the present invention.

FIG. 13 is a plane view of an IPS mode LCD device according to an exemplary third embodiment of the present invention. FIG. 14 is a plane view of a common electrode in an IPS mode LCD device according to the exemplary third embodiment of the present invention.

In case of the IPS mode LCD device according to the second embodiment of the present invention, as shown in FIG. 11, the equipotential may be formed in the corners of the common electrode 224 and the pixel electrode 217, and the electric field may be weak due to the long distance between the common electrode 224 and the pixel electrode 217, whereby the transmissivity may be lowered due to the failure of driving the liquid crystal directors.

To overcome these problems of the IPS mode LCD device according to the second embodiment of the present invention, one part of a pixel electrode 517 is formed in a bent structure in an IPS mode LCD device according to the third embodiment of the present invention. In the IPS mode LCD device according to the third embodiment of the present invention, a common electrode 524 is adjacent to the pixel electrode 517 at the corner of pixel region, thereby improving the electric field effect.

In the IPS mode LCD device according to the third embodiment of the present invention, the line width is decreased in the common electrode overlapped with the pixel electrode, thereby preventing the distortion of electric field, by more than about 1 µm, preferably by about 3 µm.

The IPS mode LCD device according to the third embodiment of the present invention includes a plurality of gate lines 512, a plurality of data lines 515, a thin film transistor TFT, the common electrode 524, a common line 525, and the pixel electrode 517. At this time, the plurality of gate lines 512 are formed in one direction, and the plurality of data lines 515 intersect the gate lines at the right angles, thereby defining a plurality of pixel regions. Then, the thin film transistor TFT for switching the voltage is formed at each intersection point of the gate and data lines, which is comprised of a gate electrode, a semiconductor layer 514 and source and drain electrodes 515a and 515b. The common electrode 524 divides the pixel region into a plurality of blocks in a matrix-type configuration. The common line 525 is formed as one body with the common electrode 524. Also, the pixel electrode 517 having a bent pattern side is provided to divide each block into a plurality of sub-blocks.

Accordingly, each sub-block has the corner of the pixel electrode 517 formed in shape of ' ¬ ' or ' ∟ ' bent about 90°, and the corner of the common electrode 524 formed in shape of ' ¬ ' or ' ∟ ' bent about 90°.

Specifically, the common electrode 524 is comprised of a plurality of first common electrode parts 524a and a plurality of second common electrode parts 524b. The plurality of first common electrode parts 524a are formed in parallel with the gate line 512, and the plurality of second common electrode parts 524b are formed in parallel with the data line 515. The plurality of first common electrode parts 524a intersect the plurality of second common electrode parts 524b, thereby defining the plurality of blocks. In this state, the outermost common electrodes 550 are positioned at the both sides of the pixel region, so that it is possible to prevent the light leakage in the edge of the data line 515.

The outermost common electrode 550 is overlapped with the pixel electrode 517 at a minimum distance. Preferably, the line width is decreased in the predetermined portion of the outermost common electrode 550 overlapped with the pixel electrode 517, by more than about 1 µm, preferably by about 3 µm. Accordingly, the outermost common electrode 550 has a dual line width, as shown in FIG. 14. At this time, in the case of the first and second common electrode parts being overlapped with the pixel electrode, it is possible to decrease the line width therein.

The pixel electrode 517 is comprised of a plurality of first pixel electrode parts 517a and a plurality of second pixel electrode parts 517b. At this time, each of the first pixel electrode parts 517a is formed as the bent pattern part having slant lines, and the second pixel electrode part 517b connects the first pixel electrode parts 517a. Accordingly, the pixel electrode 517 including the first and second pixel electrode parts 517a and 517b divides the block into a plurality of sub-blocks 530, wherein each of the sub-blocks 530 is formed in shape of trapezoid.

Each of the sub-blocks 530 is formed in shape of trapezoid defined by the first and second common electrode parts 524a and 524b and the first and second pixel electrode parts 517a and 517b. That is, each of the sub-blocks 530 has the corner of the pixel electrode 517 formed in shape of ' ¬ ' or ' ∟ ' bent about 90°, and the corner of the common electrode 524 formed in shape of ' ¬ ' or ' ∟ ' bent about 90°.

As applying the predetermined voltage to the common electrode 524 and the pixel electrode 517, the electric field effect is maximized since the short distance between the common electrode 524 and the pixel electrode 517 is formed by the bent pattern of the first pixel electrode part. Also, the equipotential area becomes small in the corner of the block, the average turning radius of liquid crystal directors increases. As a result, the transmissivity of LCD panel improves.

By decreasing the line width in the common electrode overlapped with the pixel electrode, the remaining portion of the common electrode has the large line width, for the smooth flow of common electrode signal.

As mentioned above, the IPS mode LCD device according to the present invention has the following advantages.

In the IPS mode LCD device according to the present invention, the line width is decreased in the predetermined portion of the common electrode overlapped with the pixel electrode, so that it is possible to prevent the electric field formed in the pixel electrode by the common electrode from being distorted. At this time, the line width is decreased in the common electrode overlapped with the pixel electrode, by more than about 1 µm, preferably by about 3 µm, thereby preventing the distortion of electric field and the light leakage.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An IPS (in-plane switching) mode LCD (liquid crystal display) device comprising:
    a plurality of gate lines and a plurality of data lines on a substrate, each of the gate lines intersecting each of the data lines to define a plurality of pixel regions;
    a plurality of thin film transistors, each of the thin film transistors located in a vicinity of an intersection point between one of the gate lines and one of the data lines;
    a plurality of pixel electrodes, each of the pixel electrodes located within one of the pixel regions and electrically connected with one of the thin film transistors; and
    a plurality of common electrodes on the substrate, each of the common electrodes having an outermost common electrode and being associated with a corresponding pixel electrode,
    wherein the outermost common electrode is formed adjacent to one of the data lines, the one of the data lines having a first data line leg and a second data line leg, the outermost common electrode having a first common electrode leg having a first line width, and a second common electrode leg having a second line width,
    wherein the first common electrode leg extends in a first direction parallel to the first data line leg, and the second common electrode leg extends in a second direction parallel to the second data line leg,
    wherein the first common electrode leg is partially overlapped by the corresponding pixel electrode, the second common electrode leg is not overlapped by the corresponding pixel electrode, and the first line width of the first common electrode leg is smaller than the second line width of the second common electrode leg by more than about 1 µm to obtain a dual line width in the outermost common electrode, wherein the first line width of the first common electrode leg of the outermost common electrode is decreased in a direction of the adjacent data line, and wherein the common electrodes have a plurality of first and second common electrode parts that divide each pixel region into a plurality of unit blocks, and the pixel electrodes have a plurality of first and second pixel electrode parts that divide each unit block into a plurality of sub-blocks.

2. The IPS mode LCD device of claim 1, wherein corners of each of the sub-blocks are formed from the first and second pixel electrode parts.

3. The IPS mode LCD device of claim 1, wherein an arrangement of the first and second pixel electrode parts and the first and second common electrodes parts creates a grid pattern.

4. The IPS mode LCD device of claim 1, wherein the first line width of the first common electrode leg is decreased to reduce a transverse electric field between the first and second common electrode parts.

* * * * *